GEORGE BOHNER.

Hanging-Lamp.

No. 5,534. Reissued August 19, 1873.

Witnesses.
H. S. Sprague
H. T. Eberts

Inventor.
George Bohner
Per Atty
Wm S Sprague

AM. PHOTO-LITHOGRAPHIC CO. N.Y. (OSBORNE'S PROCESS)

UNITED STATES PATENT OFFICE.

GEORGE BOHNER, OF CHICAGO, ILLINOIS.

IMPROVEMENT IN HANGING LAMPS.

Specification forming part of Letters Patent No. 126,254, dated April 30, 1872; reissue No. 5,534, dated August 19, 1873; application filed June 30, 1873.

*To all whom it may concern:*

Be it known that I, GEORGE BOHNER, of Chicago, in the county of Cook, State of Illinois, have invented an Improvement in Hanging Lamps, of which the following is a specification:

The nature of my invention relates to an improvement in hanging lamps, whereby the lamp can be raised and lowered at will; and it consists in the peculiar supporting-ring which embraces the upper part or flange of a shade or reflector, which ring is suspended from the ceiling by means of two chains passing over sheaves journaled in a horizontal bar, one end of each chain being attached to the ring and the other to the lamp; also, in suitable guides attached to the supporting-ring, whereby the shade or reflector is kept in a horizontal position.

Figure 1:
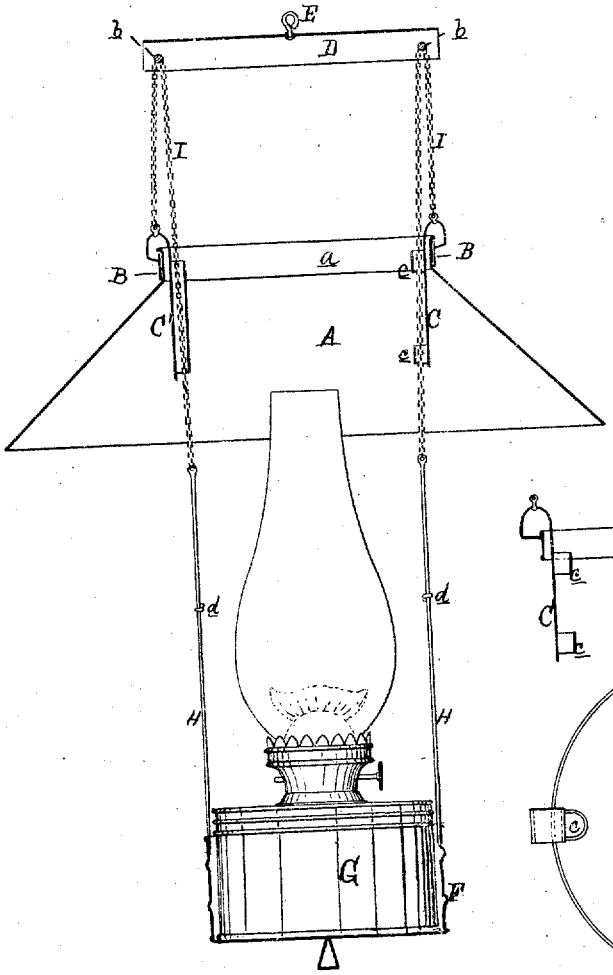
Figure 2:
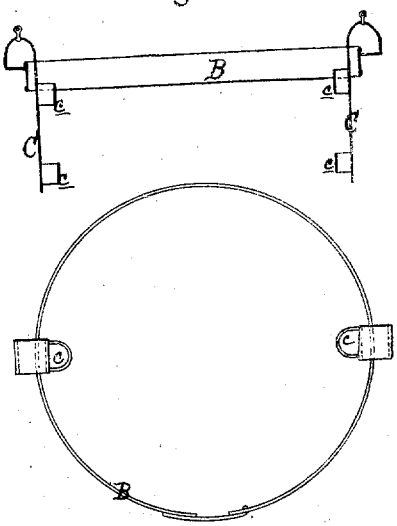

Figure 1 is a sectional elevation of my invention. Fig. 2 is a sectional view of the supporting-ring. Fig. 3 is a plan of the same.

In the drawing, A represents a conical tin lamp-shade or reflector, having a vertical flange, *a*, turned at its upper or smaller end, which flange is embraced by the supporting-ring B, the same being made of any desirable material, and in such a manner that it can be sprung around the flange; or it may be formed in two sections hinged together, and provided with any suitable device for locking it around the said flange. C are guide-bars, curved inwardly from the ring so as to hang vertically on the inside of the flange *a*, and have secured to their inner faces eyes *c c*. D is a horizontal bar, in both ends of which are journaled two sheaves, as at *b*. This bar is provided with a ring, E, by which the lamp can be suspended from a hook in the ceiling. F represents a lamp-socket, in which is placed a lamp, G. Extending upward from this socket are two rods, H, to the upper ends of which are attached the chains I I. From thence chains pass up through the eyes *c c* on the bars C, then over the sheaves at *b*, and thence down to the ring B, to which they are attached.

In order that the shade shall not be lowered too far down upon the lamp, I place suitable stops *d* in the rods H, which will allow the shade to descend until the said stops come in contact with the lower eyes *c c* on the guide-bars.

In place of the guide-bar and eyes, as described, tubes may be used for the same purpose, one of which is shown at C′ in Fig. 1.

The weight of the ring and shade should counterbalance that of the lamp and socket.

What I claim as my invention, and desire to secure by Letters Patent, is—

1. The supporting-ring B, provided with the guide-bars C and guide-eyes *c c*, or tube C′, as and for the purpose set forth.

2. The shade A, ring B, guide-bar C, with their guide-eyes *c c* or equivalent, the bar D, sheaves *b*, socket F, lamp G, rods H, and chains I, when constructed, arranged, and operating as and for the purposes specified.

GEORGE BOHNER.

Witnesses:

E. A. WALKUP,

H. S. BROWN.